United States Patent [19]

Blancke

[11] Patent Number: 4,927,101
[45] Date of Patent: May 22, 1990

[54] METHOD FOR TILTING THE MOMENT OF INERTIA OF A ROTATING FREE BODY IN SPACE INTO ANY GIVEN DIRECTION

[75] Inventor: Bernard Blancke, Le Cannet, France

[73] Assignee: Aerospatiale Societe Nationale Industrielle, Paris, France

[21] Appl. No.: 342,842

[22] Filed: Apr. 25, 1989

[30] Foreign Application Priority Data

Apr. 26, 1988 [FR] France ................................ 88 05517

[51] Int. Cl.$^5$ ............................. B64G 1/24; B64G 1/38
[52] U.S. Cl. ....................................... 244/164; 244/170
[58] Field of Search ............... 244/164, 165, 166, 169, 244/170, 176; 364/459

[56] References Cited

U.S. PATENT DOCUMENTS

| 3,558,078 | 1/1971 | Lauzaro | 244/169 |
| 3,944,172 | 3/1976 | Becker . | |
| 4,193,570 | 3/1980 | Hoffman et al. | 244/165 |
| 4,504,032 | 3/1985 | Phillips et al. | 244/170 |
| 4,848,706 | 7/1989 | Gary et al. | 244/169 |

FOREIGN PATENT DOCUMENTS

| 1372563 | 8/1964 | France . |
| 1468913 | 1/1967 | France . |
| 2581966 | 11/1986 | France . |
| 1514745 | 6/1978 | United Kingdom . |
| 2040513 | 8/1980 | United Kingdom . |

*Primary Examiner*—Galen Barefoot
*Attorney, Agent, or Firm*—Browdy & Neimark

[57] ABSTRACT

In order to shift the moment of inertia $\vec{H_i}$ of a body in rotation initially in rotation approximately about its principal axis of inertia Z into any given orientation $\vec{H_F}$ one applies transversely to the axis Z three torque impulses in a plane containing $\vec{H_i}$ and $\vec{H_F}$, the first for a time $T_1$, such that, at the end of one rotation of a satellite about itself, the axis Z shifts to $Z_1$ in the plane bisecting $\vec{H_i}$ and $\vec{H_F}$, whilst the kinetic moment moves to $\vec{H_1}$, the second impulse at the instant when the principal axis of inertia is at $Z_1$ for a time $T_2$ appropriate to shift the kinetic moment into a position $\vec{H_2}$ symmetrical with $\vec{H_1}$ with respect to this bisecting plane, and the third impulse at the instant when the principal axis of inertia is parallel to $\vec{H_F}$ for a duration equal to $T_1$.

4 Claims, 5 Drawing Sheets

METHOD FOR TILTING THE MOMENT OF INERTIA OF A ROTATING FREE BODY IN SPACE INTO ANY GIVEN DIRECTION

In a very general sense, the present invention concerns a process which makes it possible to tilt the kinetic moment of a free body, in space, in rotation about its principal axis of inertia, towards any given direction so as to attain the latter and to do this, staring from an angular value which could be quite considerable, in a short tilting time with minimal consumption of energy and a possible error at the end of the manouevre which is very small relative to the angle of tilting.

The above procedure can have many applications, especially in any case where the rotating free body (satellite, missile . . . ) is, for example, suffering gyrometric breakdown, given that it includes an angular position detector, which is most likely the case.

One can for example take the case of a satellite in "flat spin" planar rotation which one can cause to align itself with an astral body, such as the earth or the sun, by employing a terrestrial or solar detector, and by commanding the thrust of appropriate thrusters, in a manner which will be described in detail in the description.

A "Process and device for stabilising a vehicle in slow rotation into a fixed direction" has indeed been described in French Patent No. 1,468,913.

That process however can be employed only with vehicles having quite specific characteristics.

In fact, that process is applicable to a "aerial vehicle rotating at constant slow speed around its centre of gravity, whose axis of symmetry is merged with one of the principal axes of its elipsoid of inertia, and whose structural configuration is such that two moments of inertia are equal to each other, and that the angle formed between the axis of symmetry and the fixed direction is less than 10°, and which is subject at the initial instant to a Poinsot movement . . . "

It can immediately be seen that the above-described stabilisation procedure will not make it possible to reorientate for example a satellite into its original direction, in the case of a gyrometric breakdown, as soon as the axis of symmetry of the satellite makes an angle greater than 10° with the initial fixed direction.

The present invention more especially concerns a procedure which makes it possible to tilt the kinetic moment ($H_i$) of a free body, in space, in stable rotation around its principal axis of inertia (Z) into any given inertial direction (sun, earth, astral body . . . ) so as to attain this direction, the said free body containing on the one hand actuators able to exert torques ($\pm \Gamma$) of fixed intensity and adjustable duration about an axis (X) perpendicular to the principal axis (Z), and on the other hand a detector of angular deviation ($D_F$) which during the free rotation of the body generates a sinusoidal deviation measurement signal representative of the angle ($\theta$) between the plane (XZ) and the plane containing X and the given inertial direction (sun, earth, astral body . . . ) towards which one wishes to tilt the kinetic moment of the free body.

This procedure is characterised in that it consists of:

(a) identifying, if appropriate, the exact period of proper rotation of the free body, from the difference between two successive passages through zero of the sinusoidal deviation measurement signal representative of the angle ($\theta$) and thus the instantaneous real speed of spin ($\omega$), which gives the valve of the initial kinetic moment ($H_i.I.\theta$) of the free body in rotation;

(b) when the deviation measurement signal of the angle ($\theta$) passes through zero with a positive (or respectively negative) speed, giving by means of the actuators a first impulse of positive (or respectively negative) torque ($\Gamma$) about the axis (X) for a predetermined time ($T_1$), which has the effect of displacing the initial kinetic moment ($H_i$) to ($H_1$), while the principal axis of inertia (Z) of the body in rotation follows a nutation movement around ($H_1$) to a point ($Z_i$);

(c) when the deviation measurement signal of the angle ($\theta$) passes again through zero with a positive (or respectively negative) speed and which corresponds to the instant when the principal axis of inertia (Z) reaches point ($Z_i$), giving a second impulse of positive (or respectively negative) torque ($\Gamma$) about the axis (X) for a predetermined time ($T_2$), which has the effect of displacing the kinetic moment ($H_1$) to ($H_2$), while the principal axis of inertial (Z) of the body in rotation follows a nutation movement around ($H_2$) to a final point (Zf);

(d) when the deviation measuring signal of the angle ($\theta$) passes again through zero with a positive (or respectively negative) speed and which corresponds to the instant when the principal axis of inertia (Z) reaches the final point ($Z_f$), giving a third impulse of positive (or respectively negative) torque ($\Gamma$) about the axis (X) for a predetermined time ($T_1$) identical to that of the first impulse, which has the effect of displacing the kinetic moment ($H_2$) to ($H_f$), which now merges with the final position ($Z_f$) of the nutation of the principal axis of inertial (Z) around ($H_2$), thanks to which the final nutation is zero and the tilting of the initial kinetic moment ($H_i$) of the rotating body towards the given inertial direction (sun, earth, astral body . . .) has been attained by only three impulses and without residual nutation.

In other words, in order to adjust the moment of inertia $\vec{H}_i$ of a body in rotation, initially in rotation approximately about its principal axis of inertia Z, towards some given orientation $\vec{H}_F$, one applies transversely to the axis Z three torque impulses in a plane containing $\vec{H}_i$ and $\vec{H}_F$ the first for a time $T_1$ such that at the end of the rotation of the satellite about it, the axis Z arrives at $Z_1$ in the plane bisecting $\vec{H}_i$ and $\vec{H}_F$, while the kinetic moment arrives at $\vec{H}_1$, the second impulse at the instant when the principal axis of inertia is at $Z_1$ for a time $T_2$ appropriate to adjust the kinetic moment into a position $\vec{H}_2$ symmetrical with $\vec{H}_1$ with the reference to this bisecting plane, and the third impulse at the instant when the principal axis of inertia is parallel to $\vec{H}_1$ for a duration equal to $T_1$.

Other characteristics, advantages and features of the present invention will appear from the description which is given hereafter with reference to the accompanying drawings in which :

FIGS. 11, 12 and 13 are tracks of simulations, carried out by the Applicants, of the operation of the process or method according to the invention as applied to a geostationary satellite, FIG. 11 showing the operation twice in succession, the first time for tilting towards the sun, the other time for tilting towards the earth; FIG. 12 showing a deviation measurement signal form a solar detector controlling the impulses from the thrusters and FIG. 13 showing a large amplitude tilting towards the sun.

The successive phases of the process according to the invention for tilting the kinetic moment of a free body in space will now be described.

Figure 1:
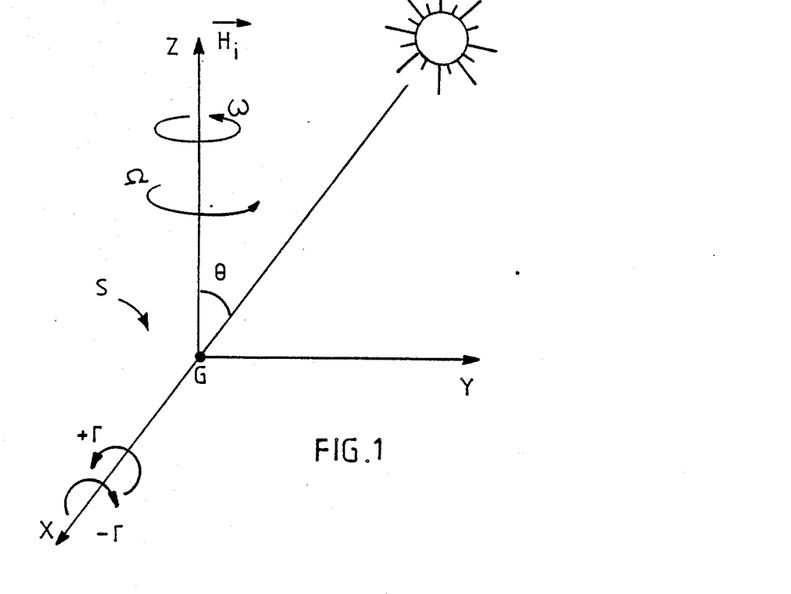
FIG. 1 is a perspective view of a satellite in space, with a principal axis GZ.
Figures 2, 4:
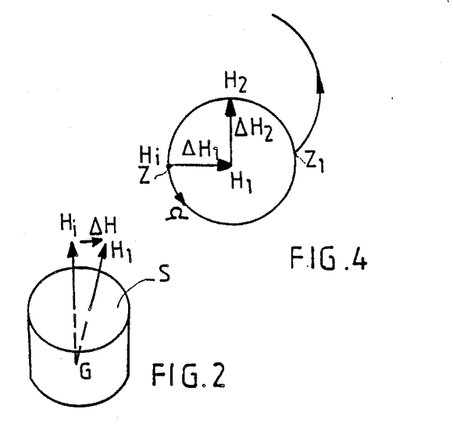
FIG. 2 is a simplified view during an inclination of its kinetic moment.
FIG. 4 is a similar diagram for two successive impulses.

It should first be remembered that a free rigid body in space, such as a satellite S, which is in rotation about its maximum axis of inertia Z, is normally stable (see FIGS. 1 and 2).

The initial kinetic moment $\vec{H}_i$ is merged with the axis of rotation GZ, and is given by the formula $H_1 = I \cdot \omega$, in which I is the principal moment of inertia and $\omega$ is the speed of rotation.

If one imparts (see FIG. 2) a transverse impulse $\vec{\Delta H}$, for example by means of the thruster exerting a torque $\pm \Gamma$ about the axis GX and perpendicular to the axis GZ, for a short time, the kinetic moment $\vec{H}_1$ is shifted in parallel with GX by a value $\vec{\Delta H}$, and becomes $\vec{H}_1$.

Figure 3:
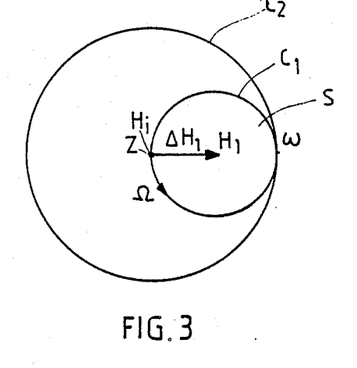
FIG. 3 is the vector diagram in a plane normal to GZ of the moments of inertia and of the subsequent rotation, after one impulse.

The satellite S then undergoes a complex movement which can be represented by the rotation of two cones $C_1$ and $C_2$ one running on the other and without sliding, as shown in plan in FIG. 3.

The large cone $C_2$ of the axis GZ linked with the satellite S, rolls upon the little cone $C_1$ of the axis $GH_1$ which is inertially fixed. The common generator of the two cones is the instantaneous speed of rotation vector.

Thus, the axis Z turns around $\vec{H}_1$ with a speed of nutation Q which is different from $\omega$.

If, at some given instant on the path described by Z around $\vec{H}_1$ one reactivates the thruster imparting the torque $\pm \Gamma$, the latter being rigidly connected to the satellite, it is evident that the direction of the transverse impulse $\Delta H$ which it will impart will depend upon the angle through which the satellite will have turned about itself.

If, for the sake of argument, one supposes that the speed of rotation $\omega$ of the satellite S about itself is $2\pi$ rd/s being 1 rotation per second, while the speed of nutation Q is $4\pi/3$ rd/s, or being 1 rotation in 1.5 seconds —and that one imparts two successive impulses (or pulses) from the thruster, one of them at the initial instant and the next 0.75 seconds later, one finds that, as appears in FIG. 4, the axis Z has executed a half turn at speed Q around $\vec{H}_1$ and reaches the position $Z_1$, while the kinetic moment $\vec{H}_1$ is instantaneously shifted by a value $\vec{\Delta H}_2$ to become $\vec{H}_2$ (while at the same time, the satellite has turned about itself at speed $\omega$ by $\mu$ of a turn) and the axis Z is going to turn starting from position $Z_1$ around $\vec{H}_2$.

From the example given above it appears clearly that if it is wished to tilt the kinetic moment of the satellite S into a fixed given direction, as for example towards the sun or towards the earth, which makes a definite angle $\theta$ with the plane XGZ, it is necessary that the thruster should impart successive impulses every second, that is to say the time corresponding to a turn about itself of the satellite at the speed, and this moreover with an angle $\theta$, at the initial moment, between the plane XZ and the direction of the sum (or the earth).

Figure 5:
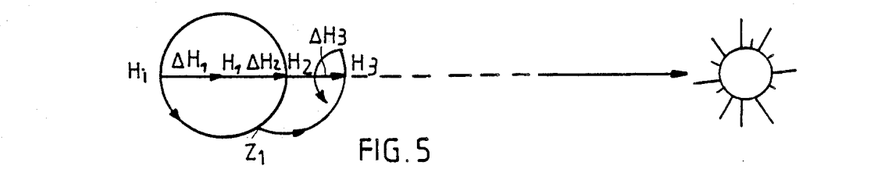
FIG. 5 is a similar diagram for a number of successive impulses.

As shown in FIG. 5, it can be seen that in this case the kinetic moment of the satellite is indeed tilted successively from $\vec{H}_i$ to $\vec{H}_1$, then to $\vec{H}_2$, $\vec{H}_3$ and so ... following a given fixed direction. It is found moreover that, in the case taken by way of example where the torque pulses imparted by the thrusters have been supposed to be of fixed intensity as well as fixed duration, at the end of a tilting manoeuvre confined to only three pulses, there exists a residual nutation which remains very slight in comparison with the angle of tilting.

In accordance with the present invention, taking account of these theoretical considerations, one can tilt the kinetic moment of the satellite S by three separate pulses between a predetermined initial point $H_i$ and a predetermined final point $H_F$, and this can be done, without residual nutation, employing thrusters delivering torque pulses of fixed intensity but variable duration, it being borne in mind that these must reman slight relative to the system's own periods, that is to say the satellite's own rotation and nutation.

Figure 6:
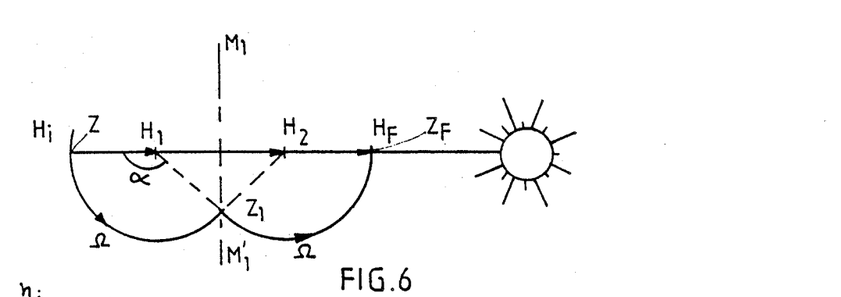
FIG. 6 is a corresponding diagram for a succession of three torque impulses applied in accordance with the invention and appropriate in conjunction with each other to tilt $\vec{H}_i$ to $\vec{H}_F$ through an angle ($\theta$)

Supposing that one wishes for example (see FIG. 6) to tilt the kinetic moment of the satellite towards the sun, between an initial position $H_i$ merged with the initial axis Z and a final position $H_F$, the angle of tilting $\theta$ between the plane XGZ and the sun being given by $H_i - H_F$, and this without residual nutation at $H_F$ one proceeds as follows:

The duration of the first pulse $H_i - H_1$ is regulated in such a manner that, at the end of a period of rotation of the satellite about itself ($\omega$), the axis Z of the satellite is at $Z_1$ on the mediatrix $M_1 - M'_1$ of $H_i - H_F$ (or in the plane bisecting axes $\vec{GH}_i$ $\vec{GH}_F$).

The duration of the third impulse $H_2 - H_F$ is obviously equal to that of the first, since $A_1$ is on the mediatrix $H_i - H_F$.

The duration of the third pulse must consequently be equal to $H_1 - H_F - (H_i - H_1 + H_2 - H_F)$, that is to say equal to $H_i - H_F - 2(H_i - H_1)$.

Without going into technical details concerning the preliminary calculation of the duration of the pulses, to which we shall revert in more detail subsequently, it can from here on be assumed as established that, the late pulse taking place when the axis Z is at $H_F$, the nutation at the end of the manouevre is therefore nil.

It has previously been seen that because the satellite normally includes an angular deviation detector, this thanks to the process according to the invention makes it possible to tilt the kinetic moment of the satellite into a fixed given direction making an angle $\theta$ with the plane XGZ at the initial instant.

If one wishes for example that this fixed direction should be the sun, one employs the angular deviation detector with which it is equipped as a one-axis solar detector.

For this purpose (see FIGS. 7 and 8) the responsive axis is normal to the axis GZ, that is to say it detects rotation about an axis normal to GX, due to the presence of a standard slit and one-direction photodiode array detector $D_F$.

Figures 7, 8:
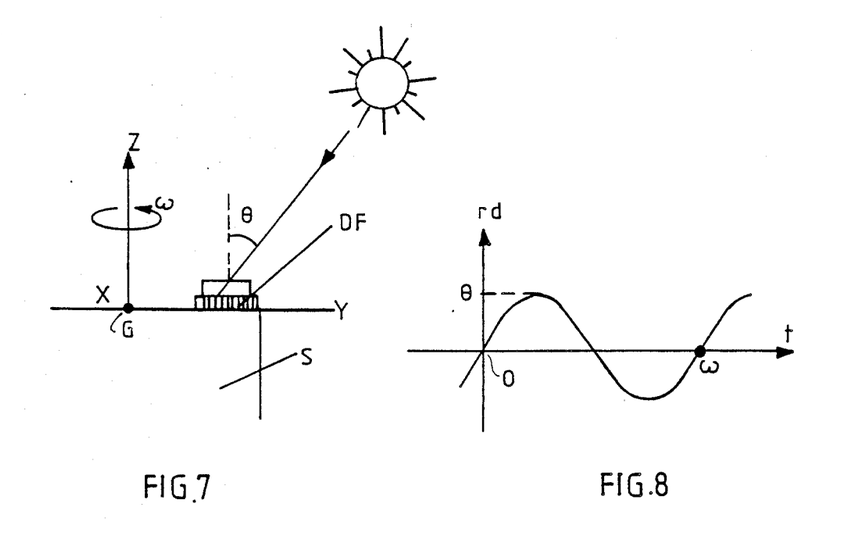
FIG. 7 is a diagram of the satellite of FIG. 1 including an angle detector in the plane containing the axis GZ and the inertial direction to be attained.
FIG. 8 is a plot of the signal from the angle detector of FIG. 7 as a function of time.

In other words, referring especially to FIG. 7, it can be seen that in this case on detects rotations around the axis GX normal to the plane of the Figure.

Furthermore, it can be seen that when the satellite S turns about itself at its speed and without nutation, that is to say before the first pulse from the thruster imparting the torque $\Gamma$ has been applied, the detector $D_F$ generates (see FIG. 8) a sinusoidal signal of frequency $\omega$ and amplitude $\theta$ corresponding to the track of the sun's rays over the photodiodes.

It can immediately be seen that when this sinusoid passes through zero, that is when the sun is in the plane ZGX, and that when this sinusoid reaches its maximum that is when the sun is in the plane ZGY, as is the case FIG. 7.

It will be seen that this signal can be employed to phase in the tilting pulses.

If one has a thruster imparting a torque pulse along X and perpendicular to Z, it is necessary to actuate this thruster when the sinusoid of the signal passes through O, thanks to which the kinetic moment of the satellite will be shifted in the direction of the sun.

This sinusoidal signal can moreover be employed to determine the angle of tilting to be effected.

If one wishes, for example, to end up with the axis GZ pointing at the sun, it is necessary to tilt the kinetic moment through an angle $\theta$ equal to the amplitude of the sinusoid.

Coming back to FIG. 6 and what has previously been said concerning the detection of the tilting angle $\theta$ of the kinetic moment with respect to FIGS. 7 and 8, the different phases of the procedure for tilting the kinetic moment of a free body in spare in accordance with the invention can now be defined in a more precise mathematical manner.

(1) The exact period of rotation possessed by the satellite is identified, if necessary, from the difference between two consecutive passages of the sinusoidal signal $\theta$ through zero, and one thus identifies the real instantaneous speed of rotation $\omega$. From this one deduces the value of the initial kinetic moment $H_i = I]\omega$;

(2) When the signal $\theta$ passes through zero with a positive (or respectively negative) speed, one gives a first positive (or respectively negative) torque impulse about X, for a period $T_1$;

(3) When the signal $\theta$ again passes through zero with a positive (or respectively negative) speed, one imparts a further positive (or respectively negative) torque impulse $\Gamma$ about X, but this time for a period $T_2$;

(4) When the signal $\theta$ again passes through zero with a positive (or respectively negative) speed, one imparts a final positive (or respectively negative) torque impulse $\Gamma$ about X, for the same period $T_1$ as the first impulse.

Recalling that in accordance with the invention:

(a) the actuators, in this case the thrusters, are designed to exert torques $\pm \Gamma$ about an axis perpendicular to the maximum principal axis of inertia GZ, in space the axis GX, these torque having a fixed intensity and a variable duration which however is slight as compared with the system's own periods, that is to say the rotation proper and the nutation;

(b) the angular deviation detector gives the angle $\theta$ between the plane XZ (containing the principal axis of inertia and the axis of the torque pulses) and the plane containing the axis of the torque pulses and the inertial reference point (sun, earth) towards which one wishes to tilt;

it will be seen that the variable periods $T_1$ and $T_2$ of the fixed-intensity torques can be calculated in advance in the following manner:

Referring to FIG. 6, it will be seen that :

the first impulse displaces, quasi-instantaneously, the kinetic moment from $H_i$ to $H_1$ so that one has $H_i - H_1 =$ Arctg $(\Gamma T_1)/H$ where $\Gamma$ is the torque of the thruster actuated (it is recalled that this FIG. 6 describes angles about X);

the axis Z of the satellite then performs a nutation movement about $H_1$; when it is at $Z_1$, the second impulse takes place which displaces $H_1$ to $H_2$ inclining the kinetic moment by an angle equal to Arctg $(\Gamma \cdot T_2)/H$ with H being the mean modulus of the kinetic moment:

the last impulse takes place when the axis Z is at $H_F$, from which it follows that the final nutation is therefore nil.

So as to minimize the consumption of energy, that is to say the path from $H_i$ to $H_F$, one should carry out the displacement always in the same direction (in the case in point that the sun), which necessitates actuating the thrusters at each period of its own rotation (spin), that is to say at each rotation of the satellite about itself around the axis GZ;

If the principal moments of inertial of the satellite about the axes GX, GY and GZ are designate by A, B and C, it is evident that the ratio (period of nutation/period of spin) is given by $$K = \sqrt{\frac{A \cdot B}{(C - A) \cdot (C - B)}}$$

which ratio defines the angle $\alpha$ in FIG. 6 between $H_i$ $H_1$ and $H_1 Z_1$, that is to say the aperture angle of the nutation of the axis Z around $H_1$ to reach the point Z, as then $$\alpha = \frac{2\pi}{K}$$

Thus one has:

$$H_i H_1 = H_2 H_F = \frac{H_i H_F}{2(1 - \cos\alpha)}$$

from where $H_1 H_2 - = 2 H_i H_1 \cos \alpha$, which makes it possible to calculate in advance the impulse durations $T_1$ and $T_2$, that is to say $T_1$ for the first and third impulses and $T_2$ for the second impulse.

Figures 9, 10:
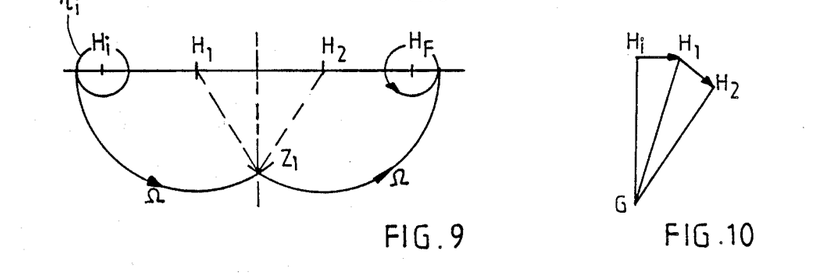
FIG. 9 is a diagram analogous to that of FIG. 6, with an initial nutation.
FIG. 10 is a diagram showing the successive kinetic moments.

Certain comments of a technical character will be made below concerning the practical operation of the process in accordance with the invention:

It is worth noting that the tilting process in accordance with the invention is theoretically independent of the existence of any initial nutation $n_i$ of $H_i$; in fact the latter, as shown in FIG. 9, only transfers itself to $H_F$ (within small errors arising from inexactitudes in the actual duration of the impulses) and in this case, at the end of the manouevre, one has a residual nutation $n_f$ which however is very slight by comparison with the angle of tilting.

It moreover should be noted that in the situation discussed above, the modulus of overall kinetic moment has altered a little in the course of the manouevre, since one has in that case employed a purely rotational thruster (that is to say one imparting a torque around the axis X).

This variation (anyway very slight if the angle of tilting is slight) can be compensated in the course of the second impulse if the period of nutation is close to twice the period of spin (see FIG. 10); if one takes a less favourable case, for example, a period of spin having a value of a third of the period of nutation, one would have a position $H'_2$ (see FIG. 10); one can, if it is desired, eliminate the resultant variation of the modulus of kinetic moment by applying a simultaneous impulse around Z defined by $\overrightarrow{H'_2 H_2}$.

It is of course evident that in order to minimise the energy-consumption as strictly as possible it would be necessary to employ at the same time as the rolling thruster (torque about X) also a yawing thruster (torque about Z) in a manner adequate to pass in a straight line from $H_I$ to $H_F$.

It is however important to not that this need by of importance only for significant angles of tilting.

The minimum tilting time is determined by the demand for minimum energy-consumption; in the case in point it is two periods of spin, which is short.

It is not necessary that the angular deviation detector should have its responsive axis exactly parallel to the impulse axis of the torque GX, starting from the moment when the stagger between the two of them is known, and that it is sufficient to take account of it by determining the instants at which the impulses are applied.

the precision of the process is downgraded insofar and to the extend that the ratio K approaches 1, a value at which tilting without residual nutation is impossible. This however is a special case which does not arise with satellite except those with a shape and constitution close to that of a flat disc.

It will be appreciated that the principle of FIG. 6 does not require equality of the moments of inertia A and B. Their possible difference would generally appear as a negligible term in the EULER equation, and if it should come to be too significant, it would always be possible to take it easily into account in the calculation of the impulses.

The Applicants have carried out simulations concerning the application of the process according to the invention to a geostationary satellite having the following particular characteristics: in slow rotation of 2.5°/s around its principal axis of inertial; the axes of symmetry of the satellite are not merged with the principal axes of inertia (6° deviation); the ratio of the principal moments of inertia is C/A=5.

Figure 11:
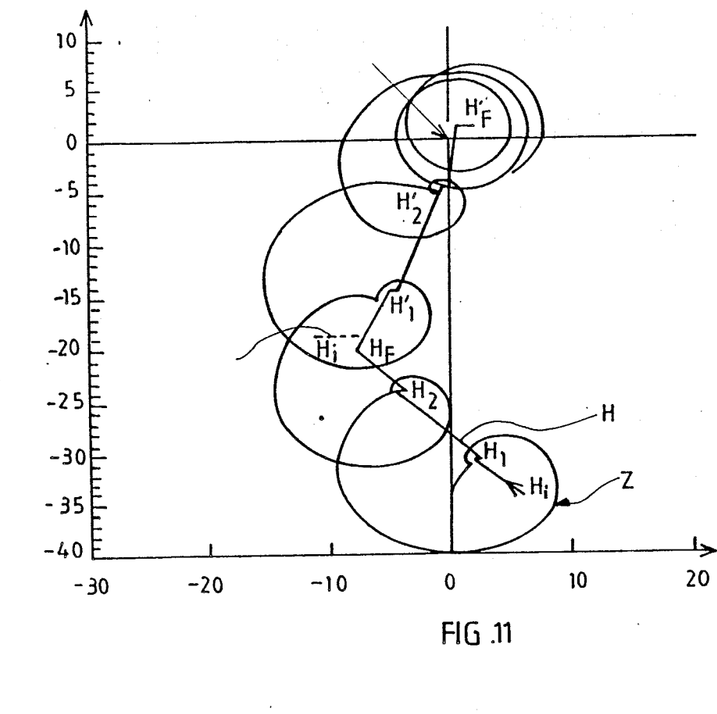

FIG. 11 shows tracks of different directions:
kinetic moment;
Z axis of the satellite;
the satellite - sun direction;
the satellite - earth direction;
with reference to the local orbital datum point, that is to say the azimuth to the EAST, and the elevation to the NORTH, in relation to the earth.

This datum point is not inertial because it is linked to the earth, and the apparent transit of the sun appears there in dotted lines.

FIG. 11 shows in fact two consecutive applications of the process according to the invention:
a first time to tilt 20° towards the sun, this employing a one-axis solar detector ;
a second time to tile 23° towards the earth, this employing a one-axis terrestrial detector.

The circles described by the Z axis of the satellite during the period of manoeuvre are not nutation but are due to the misalignment of 6° between the principal axis of inertia and the geometric axis, this being observable at the start of the manoeuvre when the nutation is nil and the angle between H and Z is 6°. The misalignment of 6° engenders a rotation of the geometric axis about the principal axis, at the speed of spin; this movement exists Independently of nutation and has effect only on detection. It suffices to correct the latter for this displacement which a priori is known (it arises in fact from the setting, effected on the sun, of the detectors with respect to the axis of the satellite). In any event, the important thing is to be well aware of the orientation of the actuators (thrusters) with respect to the detectors.

Figure 12:
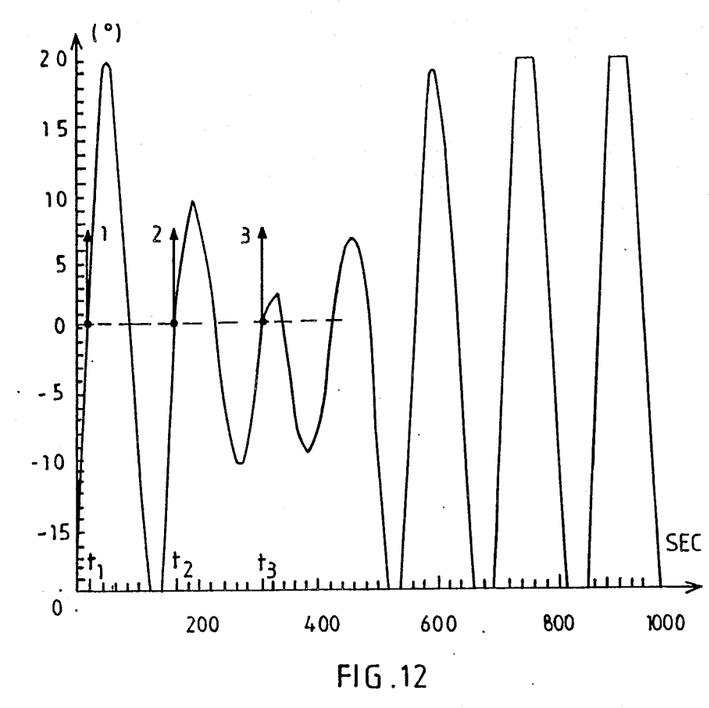

FIG. 12 shows the deviation measurement signal, in the case in point of a solar detector, which controls the instants $t_1$, $t_2$ and $t_3$ of the impulses of the thrusters; these instants correspond to the three passages through zero of the signal with a positive speed. The total duration of tilting towards the sun is two periods of spin, being 288 seconds for a speed of rotation $\omega=2.5°/s$.

Figure 13:
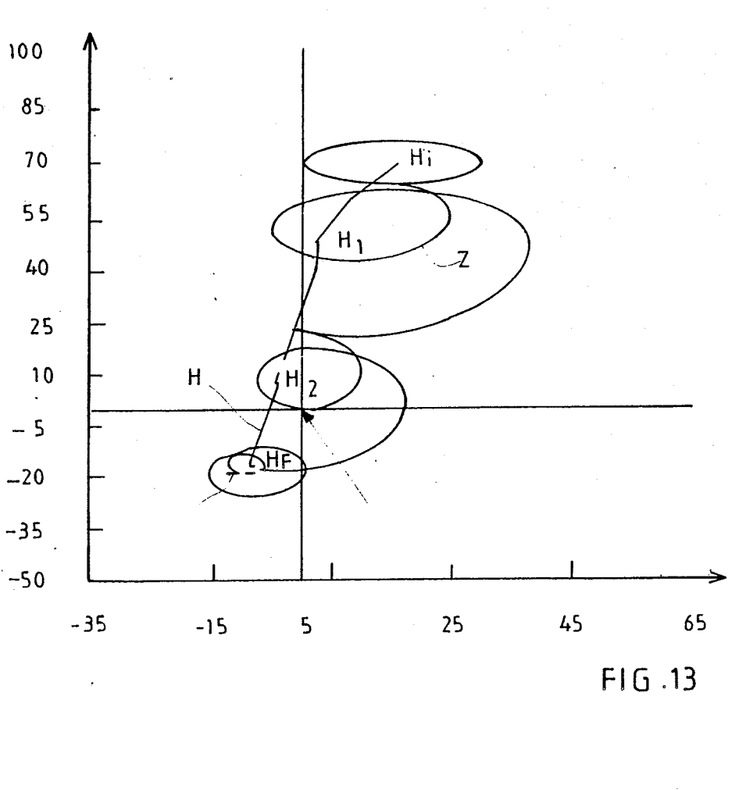

Finally, FIG. 13 is analogous to FIG. 11 but shows this time a tilting towards the sun of a very major amplitude of 90°.

It is to be noted that the tracks are distorted by the system of projection in higher latitudes.

It can be shown that the tilting process in accordance with the invention has important differences and advantages relative to the procedure for stabilisation in a fixed direction of the previously-mentioned French Patent No. 1,468,913.

It can thus be mentioned that:

(a) the moments of inertia of the satellite can be any value (except K−1) and it is not necessary to have two of them equal to each other;

(b) the condition concerning the inertial ratios according to the invention:

$$K = \sqrt{\frac{A \cdot B}{(C - A) \cdot (C - B)}} = 1$$

given that $(C-A) \cdot (C-B) \neq A \cdot B$ is much less restrictive than the condition $1 < C/A < 2$. Thus in particular one can have C/A=5 (see the simulations of FIGS. 11, 12, 13);

(c) the deviation measuring detector can have only 1 sensitive axis of detection instead of 2.

(d) it is sufficient to exert thruster torques around a single axis instead of two, particularly at small angles of tilting.

However, when one wishes, in addition, to control the modulus of kinetic moment, it becomes necessary to apply torques about two axes.

(e) the angle of tilting can be very considerable as for instance in the case of the simulation with 90° of tilting in FIG. 13.

(f) The objective of the process according to the present invention is the tilting towards a fixed direction, as for example the phase of acquisition, and not the precise stabilisation in a fixed direction with an initial deviation of less than 20°.

I claim:

1. Method for tilting the kinetic moment $\vec{H_i}$ of a free body, in space, in stable rotation about its principal axis of inertia (Z) into any given inertial direction (sun, earth, astral body . . . ) so as to attain this direction, the said free body comprising on the one hand actuators adapted to exert torques ($\pm\Gamma$) of fixed intensity and adjustable duration around an axis (X) perpendicular to the principal axis (Z); on the other hand an angular deviation detector ($D_F$) which during the rotation of the free body generates a sinusoidal deviation measurement signal indicative of the angle ($\theta$) between the plane (XZ) and the plane containing the axis of the torque (X) and the given inertial direction (sun, earth, astral body...) towards which one can tilt the kinetic moment of the free body, the said procedure being characterised in that it consists in:

(a) identifying, if appropriate, the period of proper rotation of the free body, from the difference between two successive passage through zero of the sinusoidal signal of the angle ($\theta$) and therefore the instantaneous real speed of spin ($\omega$), which gives the value of the initial kinetic moment ($H_i = I \cdot \omega$) of the free body in rotation;

(b) when the difference measuring signal for the angle ($\theta$) passes through zero with a positive (or respectively negative) speed, imparting by means of the actuator a first positive (or respectively negative) torque impulse ($\Gamma$) about the axis (X) for a predetermined period ($T_1$), whereby
displacing the initial kinetic moment ($\vec{H_i}$) to ($\vec{H_1}$) while the principal axis of inertial (Z) of the body in rotation follows a nutation movement around ($H_1$) to a point ($Z_i$);

(c) when the deviation measurement signal for the angle ($\theta$) again passes through zero with a positive (or respectively negative) speed and which corresponds to the instant when the principal axis of inertia (Z) reaches the point ($Z_i$), imparting a second positive (or respectively negative) torque impulse ($\Gamma$) around the axis ($\vec{X}$) for a predetermined time ($T_2$), which has the effect of displacing the kinetic moment ($\vec{H_1}$) to ($\vec{H_2}$), while the principal axis of inertia (Z) of the body in rotation follows a nutation movement around ($H_2$) to a final point ($Z_F$);

(d) when the deviation measurement signal for the angle ($\theta$) again passes through zero with a positive (or respectively negative) speed and which corresponds to the instant when the principal axis of inertia (Z) reaches the final point ($Z_F$), imparting a third positive (or respectively negative) torque impulse ($\Gamma$) around the axis ($\vec{X}$) for a predetermined time ($T_1$) identical to that of the first impulse, which has the effect of displacing the kinetic moment ($\vec{H_2}$) to ($\vec{H_F}$), which now merges itself with the final position ($Z_F$) of the nutation of the principal axis of inertia (Z) around ($H_2$), whereby nutation is nil and the tilting of the initial kinetic moment ($H_i$) of the body in rotation towards the given inertial direction (sun, earth, astral body...) has been secured by only three impulses and without residual nutation.

2. Method according to claim 1, characterised in that, in order to minimise as much as possible the energy consumption on the path of the kinetic moment of the body in rotation between the initial moment and the final moment ($\vec{H_i} - \vec{H_F}$) one actuates the actuators exerting the torque impulses ($\Gamma$), at each period of spin, that is to say at each rotation ($\omega$) of the body about itself around the principal axis of inertia (Z), whereby the different displacements of the kinetic moments ($H_i - H_1 - H_2 - H_F$) occurs always in the same plane containing the given inertial direction towards which one wishes to tilt.

3. Method according to claim 1, characterised in that the impulse durations ($T_1$) for the first and the third impulses and ($T_2$) for the second impulse, are predetermined starting from the nutation period/spin period relationship which itself is imposed by the ratio between the principal inertias of the body in rotation in space $$K = \sqrt{\frac{A \cdot B}{(C - A) \cdot (C - B)}}$$

which defines the angle $$\alpha = \frac{2\pi}{K}$$

in which $\alpha$ is the aperture angle of the nutation of the axis (Z) around ($H_1$) in order that the said axis passes from the initial position ($H_i$) into the position ($Z_i$), from which it follows that $$H_i H_1 = H_2 H_F = \frac{H_i H_F}{2(1 - \cos\alpha)}$$

where $H_1 H_2 = -2 H_i H_1 \cos\alpha$, which defines the impulse durations $T_1$ and $T_2$.

4. Method according to claim 1, characterised in that when there exist an initial nutation at the moment when one wishes to apply the manoeuvre to the initial kinetic moment ($H_i$), the said initial nutation is purely and simply transferred to the final kinetic moment ($H_F$).

* * * * *